US012703815B2

(12) United States Patent
Kapadia et al.

(10) Patent No.: US 12,703,815 B2
(45) Date of Patent: Aug. 11, 2026

(54) FLUX-COMPATIBLE EPOXY-ANHYDRIDE ADHESIVES COMPOSITIONS FOR LOW-GAP UNDERFILL APPLICATIONS

(71) Applicant: Henkel AG & Co. KGaA, Duesseldorf (DE)

(72) Inventors: Sandeep Kapadia, Bellflower (CA); Laxmisha M. Sridhar, Monmouth Junction, NJ (US); Zhan Hang Yang, Rocky Hill, CT (US); Pukun Zhu, Irvine (CA); Sarah Liao, Claremont (CA)

(73) Assignee: Henkel AG & Co. KGaA, Duesseldorf (DE)

( * ) Notice: Subject to any disclaimer, the term of this patent is extended or adjusted under 35 U.S.C. 154(b) by 819 days.

(21) Appl. No.: 18/073,351

(22) Filed: Dec. 1, 2022

(65) Prior Publication Data

US 2023/0114308 A1 Apr. 13, 2023

Related U.S. Application Data

(63) Continuation of application No. PCT/US2021/035194, filed on Jun. 1, 2021.

(60) Provisional application No. 63/033,136, filed on Jun. 1, 2020.

(51) Int. Cl.
*C09J 163/00* (2006.01)
*C09J 173/02* (2006.01)

(52) U.S. Cl.
CPC ........... *C09J 163/00* (2013.01); *C09J 173/02* (2013.01); *C09J 2301/408* (2020.08)

(58) Field of Classification Search
CPC ...... C08G 59/4215; C08K 3/013; C08K 3/36; C08K 5/0025; C08L 63/00; C08L 79/08; C09J 163/00; C09J 173/02; C09J 2301/408
See application file for complete search history.

(56) References Cited

U.S. PATENT DOCUMENTS 4,657,992 A 4/1987 Brennan et al.
6,265,530 B1 7/2001 Herr et al.
7,102,015 B2 9/2006 Dershem et al.
2002/0032280 A1 3/2002 Charles et al.
2003/0124378 A1 7/2003 Bober et al.
2003/0162911 A1 8/2003 Yue et al.
2005/0129956 A1 6/2005 Rubinsztajn et al.
2014/0005344 A1 1/2014 Rinker et al.
2017/0058102 A1 3/2017 Kushihara et al.
2020/0270393 A1* 8/2020 Peters ................ C08G 59/4238

FOREIGN PATENT DOCUMENTS

CN 1449418 A 10/2003
CN 111183168 A 5/2020
KR 20140124855 A 10/2014
KR 20170067069 A 6/2017
TW 201418317 A 5/2014
TW 201718691 A 6/2017
WO 2013122800 A1 8/2013
WO WO-2019070499 A1 * 4/2019 ......... C08G 59/4223

OTHER PUBLICATIONS

PCT International Search Report—WO PCT/US2021/035194—Completed: Sep. 10, 2021 Mailing date: Sep. 10, 2021—No. of p. 3.

* cited by examiner

*Primary Examiner* — Ana L. Woodward
(74) *Attorney, Agent, or Firm* — Steven C. Bauman

(57) ABSTRACT

Provided are flux-compatible epoxy-anhydride compositions useful as low-gap underfill adhesives. The flux-compatible epoxy-anhydride compositions include an epoxy component and an anhydride composition comprising a monofunctional anhydride and at least one difunctional anhydride and optionally at least one polyfunctional anhydride. The flux-compatible compositions are useful as an underfilling sealant which (1) rapidly fills the underfill space in a semiconductor device, such as a flip chip assembly, (2) enables the device to be securely connected to a circuit board by short-time heat curing and with good productivity, and (3) demonstrates excellent solder reflow resistance.

13 Claims, No Drawings

FLUX-COMPATIBLE EPOXY-ANHYDRIDE ADHESIVES COMPOSITIONS FOR LOW-GAP UNDERFILL APPLICATIONS

BACKGROUND

Field

The present disclosure relates to flux compatible epoxy-anhydride adhesives for low-gap underfill applications, to anhydride components useful in the adhesives, and to formulations comprising them.

Brief Discussion of Related Technology

In recent years, the popularity of smaller-sized electronic appliances has made desirable size reduction of semiconductor devices. As a result, chip packages are becoming reduced in size to substantially that of the bare die itself. The trend of new package design to have more functions, finer pitch, a low gap, a thinner package, and extended downstream market not only comes with higher reliability requirements, but also has created many new challenges which did not exist for previous generations of underfill technology.

The flip-chip method of attaching an integrated circuit to an organic substrate board uses a series of metal solder bumps on the integrated circuit which form interconnections with the metal bond sites on the board. The active side of the integrated circuit is flipped upside down in order to make contact between the bumps on the integrated circuit and the metal bond sites on the substrate. An organic soldering flux is used to remove metal oxides and promote wetting of the solder when the assembly is heated above the melting temperature of the solder. This process of attaching an integrated circuit to a substrate is referred to as reflow soldering. The purpose of the flux is to clean the surface of the metals to improve electrical connection. The solder or lower melting alloy may comprise the metal bond sites on the substrate, the bumps on the integrated circuit, or both, depending on the materials selected. The higher melting alloy may also similarly be present in lead-free solder.

With small gap underfill, the residue from the flux is difficult to remove from the narrow gap. Thus, no-clean fluxes in which flux residues are not removed from the board after the solder reflow process are the flux of choice for most flip-chip applications. These no-clean fluxes may be dispensed onto the metal bond sites on the board prior to chip placement. In order to maintain alignment of the chip to the board prior to the reflow process, a tacky flux may be applied to the bumps on the chip. The integrated circuit containing solder bumps is dipped into the flux to a set depth to apply a desired amount of tacky flux to only the surface of the bumps. The chip is then aligned and placed onto the substrate so that the flux-coated bumps contact the appropriate metal bond sites of the substrate. The tacky flux is formulated to contain a higher solids content, which aids in the adhesion of the chip to the substrate prior to reflow. The tacky flux thus acts as a temporary glue to hold the chip in proper alignment during placement of the assembly into the reflow oven. The tacky fluxes commonly used are the solder paste flux vehicles used in no-clean surface mount processes.

Although compositions for no-clean solder paste flux vehicles vary, a typical composition contains 50% rosin, 40% solvent, 5-8% thickeners, and 2-5% flux activators (such as organic acids and amines). While most of the solvent of the flux evaporates during the reflow process, the rosin ester and other nonvolatile residues of the solder paste constituents remain.

After solder reflow, the gap between the integrated circuit and the organic substrate in a flip-chip assembly is filled with an underfill sealant by capillary action to attach the integrated circuit to the substrate. The purpose of the underfill sealant is to relieve the thermomechanical stresses on the solder interconnections that are caused by the difference in thermal expansion coefficients between the silicon integrated chip (having, for example, a coefficient of thermal expansion (CTE)=2.5 ppm/° C.) and the organic substrate (having, for example, a CTE=15-20 ppm/° C.).

Typical underfill sealants used in flip-chip assemblies are composed of epoxy resins, curing agents, and inorganic fillers to yield a crosslinked thermosetting polymer when cured. The properties of the cured polymer, such as the CTE and elastic modulus, help relieve the thermomechanical stress on the solder joints during use, which is tested by thermal cycling testing. A typical thermal cycle test involves repeated exposure of the flip-chip assembly to two different liquids at −55° C. and 125° C. with a ten-minute dwell time at each temperature. Thus, the overall purpose of the underfill sealant is to enhance the operational life and reliability of a flip-chip assembly by relieving the thermomechanical stress on the solder joints.

Several process and material property characteristics dictate the material selection of the underfill sealant. First, the epoxy underfill sealant should flow quickly under the chip during production. The viscosity, surface tension, and particle size distributions of the sealant can be optimized to achieve efficient flow under the chip during the encapsulation step. To further reduce the underfill flow time, the substrate may be heated in order to reduce the viscosity of the uncured sealant and enhance the flow speed of the material. For example, the surface of the substrate board may be heated to 70° C. prior to dispensing the sealant in order to achieve this effect. Second, the epoxy underfill sealant should cure relatively quickly. Typical underfill sealants are epoxy formulations designed to cure, i.e. form irreversibly cross-linked structures, at temperatures of 130-170° C. Finally, the epoxy underfill sealant should adhere strongly to both the chip and substrate during thermal cycling tests. If the epoxy pulls away, or delaminates, from either the chip or substrate surface, proper stress relief on the interconnections will not be achieved.

The interaction between the no-clean flux residue and the epoxy underfill sealant is important to achieving maximum adhesion and desirable flip-chip reliability. Typical solder paste flux compositions used as tacky fluxes for the flip-chip process contain rosin or a similar resin. A residue of rosin and other nonvolatile organic constituents of the flux remain on the substrate after the reflow soldering of the integrated circuit to the substrate. Although these no-clean residues are benign to the assembly in terms of their corrosivity, these residues have been known to cause voiding and solder extrusion, adversely affecting the adhesion and electrical integrity of the device. This result may lead to early delamination from the chip surface due to the poor adhesion of the underfill sealant. This delamination of the sealant from the chip can be detected and measured using scanning acoustic microscopy (SAM), which allows detection of the presence of voids between the surface of the chip and the epoxy underfill.

Thus, flux compatibility with the underfill sealant is an important criterion for underflow process performance. While existing epoxy-anhydride underfills have shown good compatibility with commonly-used fluxes, they have also had issues such as low adhesion and high moisture absorption, which could cause lower reflow stability. In addition, this high moisture absorption is also a concern for surface insulation resistance (SIR) performance.

Accordingly, a flux-compatible underfill adhesive that maintains Tg stability and has low moisture absorption would be highly desirable.

SUMMARY

The present disclosure provides flux-compatible compositions useful as an underfill sealant which (1) rapidly fills the underfill space in a semiconductor device, such as a flip chip assembly, (2) enables the device to be securely connected to a circuit board by short-time heat curing and with good productivity, and (3) demonstrates excellent solder reflow resistance. The compositions comprise an epoxy resin component, a hydrophobic anhydride component and optionally a bismaleimide resin. The present disclosure also provides the hydrophobic anhydride component as an anhydride composition itself.

Using the compositions of the present disclosure, semiconductor devices, such as flip chip assemblies, may be (1) assembled quickly and without production line down time because of improved cure speed and extended useful working life, and (2) securely connected to a circuit board by short-time heat curing of the composition, with the resulting mounted structure (at least in part due to the cured composition) demonstrating excellent solder reflow resistance The hydrophobic anhydride composition comprises a monofunctional anhydride ("mono anhydride") such as methyl nadic anhydride (methyl-5-norbornene-2,3-dicarboxylic anhydride; "MNA") or 5-norbornene-2,3-dicarboxylic anhydride and one or more difunctional anhydride crosslinkers ("dianhydrides") and polyfunctional anhydrides ("polyanhydrides"), as described further below. The inventive formulations provide superior moisture resistance, reflow resistance and high temperature die shear adhesion. This blend of mono anhydride and dianhydrides and optionally polyanhydrides confers to the inventive underfill sealants many of the benefits and advantages disclosed herein.

The benefits and advantages of the present disclosure will become more readily apparent from the detailed description below.

DETAILED DESCRIPTION

The disclosure provides flux-compatible underfill sealants comprising an epoxy resin component, a hydrophobic anhydride composition component, and optionally a bismaleimide resin, as well as the hydrophobic anhydride composition component itself.

The hydrophobic anhydride component comprises one or more mono anhydrides and one or more dianhydrides or polyanhydrides.

The mono anhydride in the hydrophobic anhydride component comprises methyl nadic anhydride (methyl-5-norbornene-2,3-dicarboxylic anhydride; "MNA"), 5-norbornene-2,3-dicarboxylic anhydride or a mixture thereof. The hydrophobic anhydride component may also comprise, in addition to the above, other mono anhydrides such as hexahydro-4-methylphthalic anhydride (MHHPA), methyltetrahydrophthalic anhydride (MTHPA), methylcyclohexene-1,2-dicarboxylic anhydride, methylbicyclo[2.2.1]heptane-2,3-dicarboxylic anhydride, bicyclo[2.2.1]heptane-2,3-dicarboxylic anhydride, (2-dodecen-1-yl) succinic anhydride, glutaric anhydride, citraconic anhydride, methylsuccinic anhydride, 2,2,-dimethylsuccinic anhydride, 2,2, dimethylglutaric anhydride, 3-methylglutaric anhydride, 3,3-Tetramethyleneglutaric anhydride, 3,3-Dimethylglutaric anhydride or mixtures thereof.

The dianhydrides in the hydrophobic anhydride component may be one or more difunctional anhydride crosslinkers selected from 4,4'-(4,4'-isopropylidene diphenoxy)bis(phthalic anhydride), 5-(2,5-dioxotetrahydrofuryl)-3-methyl-3-cyclohexene-1,2-dicarboxylic anhydride, 4,4'-oxydiphthalic anhydride, pyromellitic dianhydride, 1,4,5,8-naphthalenetetracarboxylic dianhydride, benzophenone-3,3',4,4'-tetracarboxylic dianhydride, 3,3',4,4'-biphenyltetracarboxylic dianhydride, bicyclo[2.2.2]oct-7-ene-2,3,5,6-tetracarboxylic dianhydride, cyclobutane-1,2,3,4-tetracarboxylic dianhydride, 1,2,4,5-benzenetetracarboxylic-1,2:4,5-dianhydride, tetrahydrofuran-2,3,4,5-tetracarboxylic dianhydride and a mixture thereof. However, other dianhydrides are within the scope of the present disclosure provided they are soluble in the mono anhydride.

The polyanhydride component may be one or more of polypropylene-graft-maleic anhydride, polyethylene-graft-maleic anhydride, butadiene-maleic anhydride copolymers, styrene-maleic anhydride copolymers and other copolymers and terpolymers of maleic anhydride.

The ratio of mono anhydride to dianhydride in the anhydride blend may be 1:0.5, preferably 1:0.2, and more preferably 1:0.1. Thus, the ratio of mono anhydride to dianhydride in the anhydride blend may be from about 1:0.5 to about 1:0.02. The ratio is primarily dictated by the solubility of the solid dianhydride(s) in liquid mono anhydrides.

The dianhydride(s) in the hydrophobic anhydride blend may preferably comprise 4,4'-(4,4'-isopropylidene diphenoxy)bis(phthalic anhydride), 5-(2,5-dioxotetrahydrofuryl)-3-methyl-3-cyclohexene-1,2-dicarboxylic anhydride, or mixtures thereof. However, other dianhydrides are within the scope of the present disclosure.

The ratio of mono anhydride to dianhydride in the anhydride blend may be about 1:1, preferably about 1:0.2 and more preferably about 1:0.05 or any value in between on a weight basis. Thus, the ratio of mono anhydride to dianhydride in the anhydride blend may be from about 1:1 to about 1:0.02 on a weight basis.

The epoxy component comprises one more epoxy resins selected from glycidyl ethers, glycidyl esters, cycloaliphatic epoxy, and aromatic amine derived glycidyl resins, including but not limited to commercial epoxy resins such as bisphenol F diglycidyl ether, bisphenol A diglycidyl ether, HP 7200L, EPN9820, ERL4221, Vikolox 68, and Vikolox LD, diepoxide of the cycloaliphatic alcohol, hydrogenated bisphenol A diglycidyl ether (commercially available as Epalloy 5000), a difunctional cycloaliphatic glycidyl ester of hexahydrophthallic anhydride (commercially available as Epalloy 5200), Epiclon EXA-835LV, Epiclon HP-7200L, and the like, as well as mixtures of any two or more thereof.

Additional examples of conventional epoxy materials which are suitable for use as the epoxy component or as optional additional component(s) are listed below. The glycidyl ether/ester compounds useful herein are not particularly limited, and examples of the compounds commercially available include: bisphenol A type epoxy resins such as Epikote 828EL and Epikote 1004 (all manufactured by Japan Epoxy Resin Co., Ltd.); bisphenol F type epoxy resins such as Epikote 806 and Epikote 4004 (all manufactured by Japan Epoxy Resin Co., Ltd.); bisphenol S type epoxy resins such as Epiclon EXA1514 (manufactured by Dainippon Ink and Chemicals Inc.) and SE 650 manufactured by Shin A T&C; 2,2'-diallyl bisphenol A type epoxy resins such as RE-81 ONM (manufactured by Nippon Kayaku Co., Ltd.); hydrogenated bisphenol type epoxy resins such as Epiclon EXA7015 (manufactured by Dainippon Ink and Chemicals Inc.); propyleneoxide-added bisphenol A type epoxy resins such as EP-4000S (manufactured by ADEKA Corporation); resorcinol type epoxy resins such as EX-201 (manufactured by Nagase ChemteX Corporation); biphenyl type epoxy resins such as Epikote YX-4000H (manufactured by Japan Epoxy Resin Co., Ltd.); sulfide type epoxy resins such as YSLV 50TE (manufactured by Tohto Kasei Co., Ltd.); ether type epoxy resins such as YSLV 80DE (manufactured by Tohto Kasei Co., Ltd.); dicyclopentadiene type epoxy resins such as EP-4088S and EP4088L (manufactured by ADEKA Corporation); naphthalene type epoxy resins such as SE-80, SE-90, manufactured by Shin A T&C; glycidyl amine type epoxy resins such as Epikote 630 (manufactured by Japan Epoxy Resin Co., Ltd.), Epiclon 430 (manufactured by Dainippon Ink and Chemicals Inc.) and TETRAD-X (manufactured by Mitsubishi Gas Chemical Company Inc.); alkylpolyol type epoxy resins such as ZX-1542 (manufactured by Tohto Kasei Co., Ltd.), Epiclon 726 (manufactured by Dainippon Ink and Chemicals Inc.), Epolight 8OMFA (manufactured by Kyoeisha Chemical Co., Ltd.) and Denacol EX-611 (manufactured by Nagase ChemteX Corporation); rubber modified type epoxy resins such as YR-450, YR-207 (all manufactured by Tohto Kasei Co., Ltd.) and Epolead PB (manufactured by Daicel Chemical Industries, Ltd.); glycidyl ester compounds such as Denacol EX-147 (manufactured by Nagase ChemteX Corporation); bisphenol A type episulfide resins such as Epikote YL-7000 (manufactured by Japan Epoxy Resin Co., Ltd.); and others such as YDC-1312, YSLV-BOXY, YSLV-90CR (all manufactured by Tohto Kasei Co., Ltd.), XAC4151 (manufactured by Asahi Kasei Corporation), Epikote 1031, Epikote 1032 (all manufactured by Japan Epoxy Resin Co., Ltd.), EXA-7120 (manufactured by Dainippon Ink and Chemicals Inc.), TEPIC (manufactured by Nissan Chemical Industries, Ltd.).

Examples of the commercially available phenol novolak type epoxy compound include Epiclon N-740, N-770, N-775 (all manufactured by Dainippon Ink and Chemicals Inc.), Epikote 152, Epikote 154 (all manufactured by Japan Epoxy Resin Co., Ltd.), and the like. Examples of the commercially available cresol novolak type epoxy compound include Epiclon N-660, N-665, N-670, N-673, N-680, N-695, N-665-EXP and N-672-EXP (all manufactured by Dainippon Ink and Chemicals Inc.); an example of the commercially available biphenyl novolak type epoxy compound is NC-3000P (manufactured by Nippon Kayaku Co., Ltd.); examples of the commercially available trisphenol novolak type epoxy compound include EP1032S50 and EP1032H60 (all manufactured by Japan Epoxy Resin Co., Ltd.); examples of the commercially available dicyclopentadiene novolak type epoxy compound include XD-1000-L (manufactured by Nippon Kayaku Co., Ltd.) and HP-7200 (manufactured by Dainippon Ink and Chemicals Inc.); examples of the commercially available bisphenol A type epoxy compound include Epikote 828, Epikote 834, Epikote 1001, Epikote 1004 (all manufactured by Japan Epoxy Resin Co., Ltd.), Epiclon 850, Epiclon 860 and Epiclon 4055 (all manufactured by Dainippon Ink and Chemicals Inc.); examples of the commercially available bisphenol F type epoxy compound include Epikote 807 (manufactured by Japan Epoxy Resin Co., Ltd.) and Epiclon 830 (manufactured by Dainippon Ink and Chemicals Inc.); an example of the commercially available 2,2'-diallyl bisphenol A type epoxy compound is RE-81ONM (manufactured by Nippon Kayaku Co., Ltd.); an example of the commercially available hydrogenated bisphenol type epoxy compound is ST-5080 (manufactured by Tohto Kasei Co., Ltd.); examples of the commercially available polyoxypropylene bisphenol A type epoxy compound include EP-4000 and EP-4005 (all manufactured by ADEKA Corporation); and the like. HP4032 and Epiclon EXA-4700 (all manufactured by Dainippon Ink and Chemicals Inc.); phenol novolak type epoxy resins such as Epiclon N-770 (manufactured by Dainippon Ink and Chemicals Inc.); orthocresol novolak type epoxy resins such as Epiclon N-670-EXP-S (manufactured by Dainippon Ink and Chemicals Inc.); dicyclopentadiene novolak type epoxy resins such as Epiclon HP7200 (manufactured by Dainippon Ink and Chemicals Inc.); biphenyl novolak type epoxy resins such as NC-3000P (manufactured by Nippon Kayaku Co., Ltd.); and naphthalene phenol novolak type epoxy resins such as ESN-165S (manufactured by Tohto Kasei Co., Ltd.).

Examples of the alicyclic epoxy compounds useful in synthesizing some of the inventive resins include, without limitation, polyglycidyl ethers of polyhydric alcohols having at least one alicyclic ring and cyclohexene oxide- or cyclopentene oxide containing compounds obtained by epoxidizing cyclohexene ring or cyclopentene ring-containing compounds. Specific examples include hydrogenated bisphenol A diglycidyl ether, 3,4-epoxycyclohexylmethyl 3,4-epoxycyclohexanecarboxylate, 3,4-epoxy-I-methyl cyclohexyl-3,4-epoxy-1-methylcyclohexanecarboxylate, 6-methyl-3,4-epoxycyclohexylmethyl-6-methyl-3,4-epoxy-cyclohexanecarboxylate, 3,4-epoxy-3-methylcyclohexylmethyl 3,4-epoxy-3-methylcyclohexanecarboxylate, 3,4-epoxy-5-methylcylcohexylmethyl-3,4-epoxy-5-methylcyclohexanecarboxylate, 2-(3,4-epoxycyclohexyl-5,5-spiro-3,4-epoxy)cyclohexane-metadioxane, bis(3,4-epoxycyclohexylmethyl) adipate, 3,4-epoxy-6-methylcyclohexyl carboxylate, methylenebis(3,4-epoxycyclohexane), dicyclopentadiene diepoxide, ethylenebis(3,4-epoxycyclohexanecarboxylate), dioctylepoxyhexahydrophthalate, and di-2-ethylhexyl epoxyhexahydrophthalate.

Some of these alicyclic epoxy resins are commercially available as: UVR-6100, UVR-6105, UVR-6110, UVR-6128, and UVR-6200 (products of Dow Corporation); CELLOXIDE 2021, CELLOXIDE 2021P, CELLOXIDE 2081, CELLOXIDE 2083, CELLOXIDE 2085, CELLOXIDE 2000, CELLOXIDE 3000, CYCLMER A200, CYCLMER M100, CYCLMER M101, EPOLEAD GT-301, EPOLEAD GT-302, EPOLEAD 401, EPOLEAD 403, ETHB, and EPOLEADHD 300 (products of Daicel Chemical Industries, Ltd.); KRM-2110 and KRM-2199 (products of ADEKA Corporation).

Examples of useful epoxy curing agent include but are not limited to the Ajicure series of hardeners available from Ajinomoto Fine-Techno Co., Inc.; the Amicure series of curing agents available from Air products and the JER-CURE™ products available from Mitsubishi Chemical, imidazoles and encapsulated imidazoles available from A&C catalysts Inc. and Evonik Corporation. These curing agents or hardeners or hardeners are used in the amount of about 1% to about 50% by weight of the total composition, more preferably from about 5% to about 20% by weight of the total composition.

In certain embodiments, compositions according to the present invention optionally further comprise one or more flow additives, adhesion promoters, conductivity additives, rheology modifiers, or the like, as well as mixtures of any two or more thereof. Various additives may be contained in the composition as desired, for example, organic or inorganic fillers, thixotropic agents, silane coupling agents, diluents, modifiers, coloring agents such as pigments and dyes, surfactants, preservatives, stabilizers, plasticizers, lubricants, defoamers, leveling agents and the like; however it is not limited to these. In particular, the composition preferably comprises an additive selected from the group consisting of organic or inorganic filler, a thixotropic agent, and a silane coupling agent. These additives may be present in amounts of about 0.1% to about 50% by weight of the total composition, more preferably from about 2% to about 10% by weight of the total composition.

The thixotropic agent may include, but is not limited to, talc, fume silica, superfine surface-treated calcium carbonate, fine particle alumina, plate-like alumina; layered compounds such as montmorillonite, spicular compounds such as aluminum borate whisker, and the like. Among them, talc, fume silica and fine alumina are particularly desired. These agents may be present in amounts of about 1% to about-50%, more preferably from about 1% to about 30% by weight of the total composition.

The silane coupling agent may include, but is not limited to, γ-minopropyltriethoxysilane, γ-mercaptopropyltrimethoxysilane, γ-methacryloxypropyltrimethoxysilane, γ-glycidoxypropyltrimethoxylsilane, and the like.

As used herein, "flow additives" refers to silicon polymers, ethyl acrylate/2-ethylhexyl acrylate copolymers, alkylol ammonium salt of phosphoric acid esters of ketoxime, and the like, as well as combination. Several of these additives are available from commercial sources such as BYK and Evonik Corporation.

The ratio of the epoxy component to the hydrophobic anhydride component in the underfill composition may be from about 1:1 to about 1:0.6. The ratio is preferably about 1:0.9. In addition, the above formulation may optionally contain a bismaleimide resin up to 50% by weight of the composition. The combination of epoxy resin and anhydride blend and optionally bismaleimide resin typically makes up about 50% of the underfill adhesive, the remainder comprising curing agents, accelerators, catalysts, flow modifiers, fillers, adhesion promoters, thixotropic agents, and the like as described above.

Certain maleimide-containing compounds may be useful in combination with epoxy resins, anhydrides and imidazole or amine type curing agents.

Those maleimide-containing compounds include, for example, maleimides having the following structures:

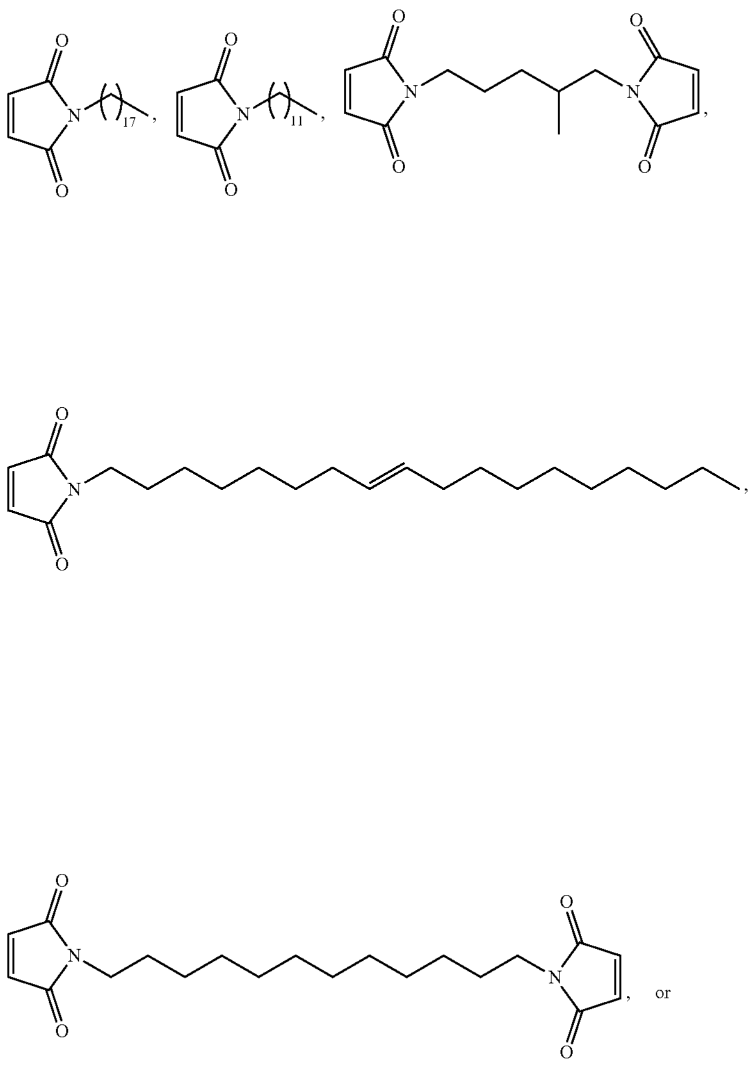

or

-continued

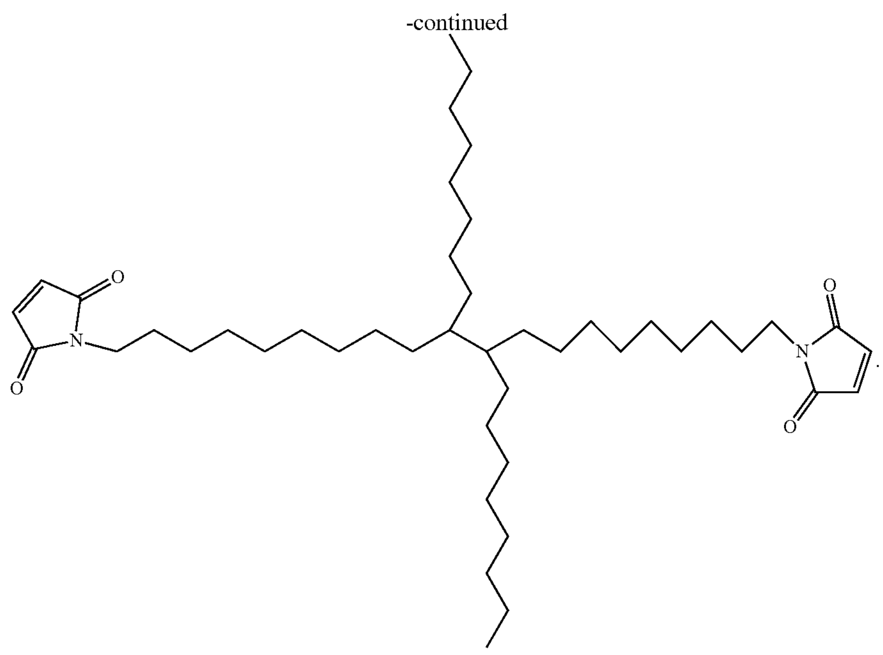

Additional maleimide-containing compounds include stearyl maleimide, oleyl maleimide, phenyl maleimide, 1,20-bismaleimido-10,11-dioctyl-eicosane, and the like, as well as combinations thereof.

Particularly desirable maleimide compounds include bismaleimides prepared by reaction of maleic anhydride with dimer amines. An exemplary bismaleimide which can be prepared from such dimer amines is 1,20-bismaleimido-10,11-dioctyl-eicosane, which would likely exist in admixture with other isomeric species produced in the ene reactions employed to produce dimer acids. Other bismaleimides contemplated for use in the practice of the present invention include bismaleimides prepared from aminopropyl-terminated polydimethyl siloxanes (such as PS510 sold by Hüls America, Piscataway, NJ), polyoxypropylene amines (such as D-230, D-400, D-2000 and T-403, sold by Texaco Chemical Company, Houston, TX), polytetramethyleneoxide-di-p-aminobenzoates (such as the family of such products sold by Air Products and Chemicals, Inc., Allentown, PA, under the trade name VERSALINK, e.g., VERSALINK P-650), and the like. Preferred maleimide resins include stearyl maleimide, oleyl maleimide, behenyl maleimide, 1,20-bismaleimido-10,11-dioctyl-eicosane, and SRM-1, which is a Fischer esterification product of 6-maleimidocaproic acid and dimer diol (Pripol 2033 that is commercially available from Croda), as well as mixtures of any two or more thereof. Bismaleimides made by maleidization and Fischer esterification of polyesterpolyols with 6-maleimidocaproic acid can also be used in this invention and the synthesis is described in patents granted to Henkel Corporation U.S. Pat. Nos. 7,102,015, 6,265,530.

Bismaleimides can be prepared employing techniques well known to those of skill in the art, and as such will not be repeated here.

The ratio of the epoxy resin component to the hydrophobic anhydride component in the underfill sealant may be from about 1:1 to about 1:0.6 and preferably about 1:0.9. In addition, the above formulation may optionally contain a bismaleimide resin up to 50% by weight of the composition. The combination of epoxy resin and anhydride component and optionally bismaleimide resin typically makes up about 50% of the underfill sealant, the balance being selected from curing agents, accelerators, catalysts, flow modifiers, fillers, adhesion promoters, and thixotropic agents.

The present disclosure provides the following non-limiting and non-exhaustive examples.

EXAMPLES

Epoxy resin components and a hydrophobic anhydride component comprising monofunctional anhydride(s) and certain solid difunctional anhydride(s) were made as described below. The anhydride component and the epoxy components were combined to make flux-compatible underfill compositions that were then tested.

Example 1: Preparation of Anhydride Component 1

In a 500 mL, three-necked flask equipped with a thermocouple, mechanical stirrer, and a nitrogen inlet were placed methyl nadic anhydride and 4,4'-(4,4'-isopropylidene diphenoxy)bis(phthalic anhydride) at an appropriate ratio. The mixture was stirred at 70° C. using the mechanical stirrer under a slow stream of nitrogen until it became homogeneous (about two to three hours). After cooling to room: temperature, the mixture was transferred to a container, yielding anhydride component 1 with an anhydride equivalent weight (AEW) of 180.41.

Example 2: Preparation of Anhydride Component 2

In a 500 mL, three-necked flask equipped with a thermocouple, mechanical stirrer, and a nitrogen inlet were placed methylcyclohexene-1,2-dicarboxylic anhydride, methyl nadic anhydride, and 5-(2,5-dioxotetrahydrofuryl)-3-methyl-3-cyclohexene-1,2-dicarboxylic anhydride at an appropriate ratio. The mixture was stirred at 70° C. using the mechanical stirrer under a slow stream of nitrogen until it became homogeneous (about two hours). After cooling to room temperature, the mixture was transferred to a container, yielding anhydride component 2 with an anhydride equivalent weight (AEW) of 171.23.

Example 3: Preparation of Anhydride Component 3

In a 500 mL, three-necked flask equipped with a thermocouple, mechanical stirrer, and a nitrogen inlet were placed a blend of methyl-5-norbornene-2,3-dicarboxylic anhydride and 5-norbornene-2,3-dicarboxylic anhydride and 4,4'-(4,4'-isopropylidene diphenoxy)bis(phthalic anhydride) at an appropriate ratio. The mixture was stirred at 70° C. for two hours under a slow stream of nitrogen until the mixture became homogeneous. After cooling to room temperature, the mixture was transferred to a glass container yielding an anhydride blend 3 with an anhydride equivalent weight (AEW) of 186.62.

Example 4: Preparation of an Epoxy-Bismalemide Blend

An epoxy-BMI resin blend was made by speed mixing Epiclon HP4032D (naphthalene diglycidyl ether), Epothoto ZX-1059 (cycloaliphatic epoxy)), Celloxide 2021P epoxy resins (cycloaliphatic epoxy), and liquid bismaleimide resin BMI 2300 (Henkel Corporation U.S. Pat. Nos. 7,102,015, 6,265,530) at an appropriate ratio. Epiclon HP4032D (naphthalene diglycidyl ether) was obtained from DIC, Celloxide 2021P (cycloaliphatic epoxy) was obtained from Daicel Corporation, Epototo ZX-1059 (cycloaliphatic epoxy) was obtained from Nippon Steel Chemical Co., Ltd.

The following inventive underfill compositions (Sample Nos. 1-7, Table 1) were prepared using different epoxy resins, inventive anhydride components, curing agents, and fillers.

TABLE 1

Underfill formulations developed based on epoxy-anhydride chemistry

| Formulations | 1 (g) | 2 (g) | 3 (g) | 4 (g) | 5 (g) | 6 (g) | 7 (g) |
|---|---|---|---|---|---|---|---|
| Bisphenol-F based epoxy phenol novolac | 10.853 | 10.284 | 10.347 | | | | 10.47 |
| Cycloaliphatic epoxy 1 | 12.19 | 11.559 | 11.630 | | | | 11.81 |
| DCPD diglycidyl ether | | | | 8.177 | | | |
| Bisphenol F diglycidyl ether | | | | 13.616 | 1.58 | 1.58 | |
| DCPD novolac epoxy | | | | 3.134 | | | |
| Epoxy diluent 1 | | 1.699 | 1.954 | | | | |
| Epoxy diluent 2 | | 0.728 | 0.488 | | | | |
| MHHPA | | | | | 19.34 | | |
| Anhydride composition 1 | 24.449 | 25.837 | 25.689 | | | 19.34 | |
| Anhydride composition 2 | | | | 22.573 | | | |
| Anhydride composition 3 | | | | | | | 25.23 |
| Epoxy-BMI of example 4 | | | | | 27.5 | 27.4 | |
| Imidazole 1 | 0.475 | | | | 1.58 | 1.58 | |
| Phosphonium salt 1 | | 0.501 | | | | | 0.48 |
| Phosphonium salt 2 | | | 0.501 | | | | |
| Imidazole 2 | | | | 0.475 | | | |
| silica | 49.975 | 47.446 | 47.446 | 49.975 | | | 50 |
| surface treated silica | | | | | 50 | 50 | |
| Wetting agent 1 | 1.0 | 0.949 | 0.949 | 1.00 | | | 1 |
| Wetting agent 2 | 0.5 | 0.474 | 0.474 | 0.5 | | | 0.5 |
| Adhesion promoter | 0.5 | 0.474 | 0.474 | 0.5 | | | 0.5 |
| Defoamer | 0.05 | 0.047 | 0.047 | 0.05 | | 0.1 | 0.05 |
| Total | 100.00 | 100.00 | 100.00 | 100.00 | 100.00 | 100.00 | 100.0 |

Performance Evaluation

The above formulations were tested for capillary flow and Tg (glass transition temperature) after cure with and without added flux as shown in Table 2 below. The performance was compared to the control commercial formulation. The first Tg measurement was run after cure at the specified conditions and a second Tg measurement was run on each sample to test the Tg after a temperature ramp of 25-260° C., which mimics solder reflow conditions in the manufacture of a flip chip assembly. Two similar Tg measurements were taken for the above formulations with 5% added flux to mimic the conditions the underfill adhesive would likely encounter around the flux-rich environment around the solder balls. The control formulation showed a decrease in Tg of a few degrees Celsius with and without added flux in the second Tg DSC run. This Tg drop contributed to lower die shear adhesion of this formulation after 3 times solder reflow at 260° C. (Table 3). This Tg behavior indicates degradation of the thermoset network and the instability of the control composition to solder reflow conditions. In contrast, Formulations 5, 6, 2, and 1 showed an increase in Tg or a stability of Tg after the second run both with and without flux. The capillary flow of the formulations of the present disclosure was similar to that of the control.

TABLE 2

Testing of underfill formulations

| Formulations | Capillary flow at 80° C. mm at 2 min | DSC peak ° C. | Tg w/o flux (160° C.-30 min cure) 1st | 2nd | Tg w/o flux (170° C.-30 min cure) 1st | 2nd | Tg with added 5% Flux (160° C.-30 min cure) 1st | 2nd | Tg with 5% flux (170° C.-30 min cure) 1st | 2nd |
|---|---|---|---|---|---|---|---|---|---|---|
| Control | 25 | 154 | 143 | 140 | 142 | 138 | 120 | 115 | 122 | 119 |
| Formulation 5 | 29 | 154 | 130 | 139 | 154 | 154 | 140 | 142 | 138 | 143 |
| Formulation 6 | 27 | 176 | 154 | 156 | 162 | 163 | 126 | 128 | 143 | 150 |
| Formulation 2 | 25 | 162 | 165 | 169 | 173 | 173 | 122 | 122 | 138 | 142 |
| Formulation 3 | 29 | 166 | 87 | 87 | 141 | 142 | 132 | 134 | 147 | 142 |
| Formulation 1 | 38 | 184 | 171 | 154 | 110 | 110 | 140 | 143 | 151 | 152 |
| Formulation 4 | 16 | 168 | 98 | 98 | 126 | 125 | 105 | 106 | 135 | 134 |

A high temperature die shear test was performed using 3×3 mm SIN die on green FR substrate. The formulations were initially cured at 160° C. for 30 minutes. The control formulation showed a die shear strength of 3.1 Kg at 260° C. However, this dropped to about 2.5 after 3 times solder reflow. In contrast, inventive formulations 5 and 2 (the only formulations tested for high temperature die shear) showed improved die shear when the assembly was subjected to 3 solder reflow conditions. These results are consistent with the stable Tg results seen with these formulations as shown in Table 2. These results show superior thermal, moisture stability and improved flux compatibility of the inventive formulations 5 and 2 as compared to the control formulation.

TABLE 3

High temperature die shear adhesion test results for lead formulations and control

| | Die and size SIN 3 × 3 mm Substrate source Green FR4 Formulations | | |
|---|---|---|---|
| | Control | Formulation 5 | Formulation 2 |
| Cured condition | 160° C.-30 mins | 160° C.-30 mins | 160° C.-30 mins |
| Average die shear strength (kg/die) at 260° C. | 3.1 | 4.5 | 1.3 |
| Standard deviation | 0.9 | 1.3 | 0.5 |
| Die shear strength after 3X solder reflow under nitrogen | | | |
| Average die shear strength (kg/die) at 260° C. | 2.5 | 7.7 | 3.7 |
| Standard deviation | 0.3 | 1.1 | 0.5 |

What is claimed is:

1. A flux-compatible epoxy-anhydride adhesive for low-gap underfill applications comprising:

an anhydride component comprising one or more mono anhydride and a dianhydride, wherein the dianhydride comprises a mixture of 4,4'-(4,4'-isopropylidene diphenoxy)bis(phthalic anhydride) and 5-(2,5-dioxotetrahydrofuryl)-3-methyl-3-cyclohexene-1,2-dicarboxylic anhydride; and an epoxy resin component comprising an epoxy resin(s) selected from monofunctional and multifunctional glycidyl ethers, glycidyl esters, cycloaliphatic epoxy, and aromatic amine derived glycidyl resins.

2. A flux-compatible epoxy-anhydride adhesive of claim 1 wherein the epoxy component is selected from one or more of bisphenol F diglycidyl ether, bisphenol A diglycidyl ether, diepoxide of a cycloaliphatic alcohol, hydrogenated bisphenol A diglycidyl ether, glycidyl esters of hexahydrophthallic anhydride, dicyclopentadiene-novolac glycidyl ether, cycloaliphatic epoxy, dicyclopentadiene dimethanol diglycidyl ether, phenol novaloc glycidyl ether, aromatic amine derived glycidyl systems, and epoxides of cyclic dienes and trienes.

3. The flux-compatible epoxy-anhydride adhesive of claim 1 further comprising a maleimide-containing compound resin.

4. The flux-compatible epoxy-anhydride adhesive of claim 3, wherein the maleimide-containing compound is derived from 6-maleimidocaproic acid Fischer esterification with aliphatic diols.

5. The flux-compatible epoxy-anhydride adhesive of claim 3 wherein the maleimide-containing compound is derived from maleinization of aromatic or aliphatic diamines or polyamines.

6. The flux compatible epoxy-anhydride adhesive of claim 1, wherein the anhydride composition further comprises a polyanhydride which is not a dianhydride.

7. The flux compatible epoxy-anhydride adhesive of claim 6 wherein the polyanhydride component comprises one or more of polypropylene-graft-maleic anhydride, polyethylene-graft-maleic anhydride, butadiene-maleic anhydride copolymers, styrene-maleic anhydride copolymers and other copolymers and terpolymers of maleic anhydride.

8. The flux-compatible epoxy-anhydride adhesive of claim 1, wherein the mono anhydride comprises methyl nadic anhydride (MNA), and one or more of methylbicyclo[2.2.1]heptane-2,3-dicarboxylic anhydride, bicyclo[2.2.1]heptane-2,3-dicarboxylic anhydride, hexahydro-4-methylphthalic anhydride (MHHPA), methyltetrahydrophthalic anhydride (MTHPA), methylcyclohexene-1,2-dicarboxylic anhydride, methylbicyclo[2.2.1]heptane-2,3-dicarboxylic anhydride, bicyclo[2.2.1]heptane-2,3-dicarboxylic anhydride, (2-Dodecen-1-yl) succinic anhydride, glutaric anhydride, citraconic anhydride, methylsuccinic anhydride, 2,2,-dimethylsuccinic anhydride, 2,2, dimethylglutaric anhydride, 3-methylglutaric anhydride, 3,3-Tetramethyleneglutaric anhydride, and 3,3-Dimethylglutaric anhydride.

9. The flux-compatible epoxy-anhydride adhesive of claim 1, wherein the ratio of the mono anhydride and the dianhydride in the anhydride component is from about 1:1 to about 1:0.02.

10. The flux-compatible epoxy-anhydride adhesive of claim 1, wherein the ratio of the epoxy to the anhydride component is from about 1:1 to about 1:0.6.

11. The flux-compatible epoxy-anhydride adhesive of claim 1, further comprising imidazole or amine curing agents, accelerators, catalysts, flow modifiers, fillers, adhesion promoters and thixotropic agents.

12. The flux-compatible epoxy-anhydride adhesive of claim 1 which is compatible with no-clean flux.

13. The flux-compatible epoxy-anhydride adhesive of claim 1, wherein the mono anhydride is methyl nadic anhydride (MNA).

* * * * *